United States Patent [19]

Van Eenam

[11] 4,298,715
[45] Nov. 3, 1981

[54] POLYAMINE/EPIHALOHYDRIN REACTION PRODUCTS

[75] Inventor: Donald N. Van Eenam, Des Peres, Mo.

[73] Assignee: Monsanto Company, St. Louis, Mo.

[21] Appl. No.: 882,493

[22] Filed: Mar. 1, 1978

[51] Int. Cl.³ .......................... C08F 8/18; C08F 8/34; C08F 8/40
[52] U.S. Cl. .................................... 525/340; 525/344; 525/359.2
[58] Field of Search .................. 526/46; 525/359, 340, 525/344

[56] References Cited

U.S. PATENT DOCUMENTS

| 2,926,161 | 2/1960 | Butler et al. | 526/17 |
| 3,700,623 | 10/1972 | Keim | 526/310 |
| 3,833,531 | 9/1974 | Keim | 526/46 |
| 3,840,504 | 10/1974 | Keim | 526/46 |
| 3,923,745 | 12/1975 | Dumas | 526/46 |

Primary Examiner—William F. Hamrock
Attorney, Agent, or Firm—David Bennett; William J. Farrington; Edward P. Grattan

[57] ABSTRACT

A process for the production of a wet strength resin comprising polymerizing a diallylamine salt, separating unreacted monomer from the reaction mixture, reacting the diallylamine polymer with an epihalohydrin and finally adding an acid to stabilize the resin solution so obtained.

3 Claims, No Drawings

POLYAMINE/EPIHALOHYDRIN REACTION PRODUCTS

BACKGROUND OF THE INVENTION

This invention relates to the products obtained by reacting a polyamine salt with an epihalohydrin. Such products are widely used as additives to improve the wet and dry strength of paper products. More particularly, the invention describes an improved process by which such additives may be obtained with greater efficiency.

DISCUSSION OF THE PRIOR ART

U.S. Pat. No. 3,700,623 describes a water-soluble resinous reaction product of (A) a linear polymer comprising units of the formula

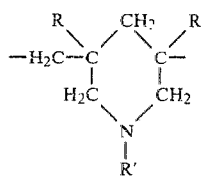

where R is hydrogen or lower alkyl, and R' is hydrogen, alkyl or a substituted alkyl group wherein the substituent is a group which will not interfere with polymerization through a vinyl double bond and is selected from the group consisting of carboxylate, cyano, ether, amino, amide, hydrazide and hydroxyl groups and (B) from about 0.5 to about 1.5 moles of an epihalohydrin per mole of secondary plus tertiary amine present in said polymer, said product being formed at a temperature of from about 30° to about 80° C. and a pH of from about 7 to about 9.5.

Two divisional applications claiming the above U.S. patent as the parent were issued as U.S. Pat. No. 3,833,531 and 3,840,504. These claim respectively, a process for making the product claimed in U.S. Pat. No. 3,700,623 and a specified amine copolymer/epihalohydrin reaction product.

The basic process claimed in U.S. Pat. No. 3,833,531 comprises (1) reacting in aqueous solution
  (a) a linear polymer wherein from 5 to 100% of the recurring units have the formula

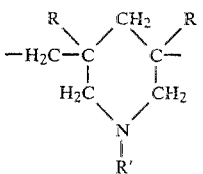

where R is hydrogen or lower alkyl and R' is alkyl or a substituted alkyl group wherein the substituent is a group which will not interfere with polymerization through a vinyl double bond and is selected from the group consisting of carboxylate, cyano, ether, amino, amide, hydrazide and hydroxyl groups with (b) from about 0.5 to about 1.5 moles of an epihalohydrin per mole of secondary plus tertiary amine present in said polymer at a temperature of about 30° to about 80° C. and a pH from about 7 to about 9.5 to form a water-soluble resinous reaction product containing epoxide groups; and then (2) reacting the resinous reaction product, in aqueous solution, with from about 0.3 equivalents to about 1.2 equivalents per equivalent of epihalohydrin of a water-soluble acid selected from the group consisting of hydrogen halide acids, sulfuric acid, nitric acid, phosphoric acid, formic acid and acetic acid until the epoxide groups are converted substantially to the corresponding halohydrin groups and an acid-stabilized resin solution is obtained.

The polyamine which is reacted with the epihalohydrin in the above process is prepared by polymerizing the hydrohalide salt of a diallylamine having the formula

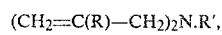

$(CH_2=C(R)-CH_2)_2N.R'$, wherein R and R' are as defined above, either alone or as a mixture with other copolymerizable ingredients, in the presence of a free radical catalyst and then neutralizing the salt to give the polymer free base.

It has now been found that the manner in which this polyamine is prepared has a very significant effect on the wetstrength properties of the final product.

STATEMENT OF THE INVENTION

The present invention describes a process for the production of an acid stabilized resin solution which process comprises (1) polymerizing an aqueous solution of a diallylamine salt having the formula $(CH_2=C(R)-CH_2)_2 NHR' \oplus X\ominus$ wherein the R groups are the same or different and are selected from hydrogen and lower alkyl groups, R' is selected from hydrogen, alkyl and substituted alkyl groups and $X\ominus$ is a halide ion, either alone or as a mixture with other copolymerizable monomers in the presence of a free radical catalyst to form a polymer in which from 5 to 100% of the recurring units are derived from the diallylamine;

(2) raising the pH of the solution sufficiently to convert at least part of the residual unpolymerized monomeric amine salt to free amine but not so high as to precipitate the polyamine from solution;

(3) separating the free amine monomer from the polyamine solution;

(4) reacting the polyamine with from about 0.5 to about 1.5 mole of an epihalohydrin per mole of amine present in said polymer at a temperature of about 30° to about 80° C. and a pH from about 7 to about 9.5 to form a water-soluble resinous reaction product containing epoxide groups; and (5) reacting the resinous reaction product in aqueous solution, with from about 0.3 equivalents to about 1.2 equivalents per equivalent of epihalohydrin of a water-soluble acid selected from the group consisting of hydrogen halide acids, sulfuric acid, nitric acid, phosphoric acid, formic acid and acetic acid until the epoxide groups are converted substantially to the corresponding halohydrin groups and an acid-stabilized resin solution is obtained.

The improvement over the disclosures in U.S. Pat. No. 3,833,531 resides in the use of a polyamine from which unreacted monomer has been removed. After completion of the polymerization reaction the pH of the solution is usually about 1.5 to 3.5 though, of course, it may be higher or lower depending on the amount of acid present. Raising the pH has the effect of regenerating the free diallylamine monomer, which being no longer soluble in aqueous solution separate out as a separate phase. This occurs at a pH of about 7 to 9. Care should be taken to avoid raising the pH of the level at which the polyamine itself separates, usually at a pH of 10 to 13. The separated monomer phase may be removed by any one or more of a number of physical processes shich as steam distillation, vaporation by gas sparging, extraction with a water-immiscible organic solvent or simply by decanting the separate phase.

Of the above, it is preferred that the unreacted diallylamine monomer be removed by steam distillation followed by condensation. The recovered monomer can then be made into the amine salt and recycled to the polymerization reaction thus avoiding the deleterious effects on the final reaction product that flow from leaving it in the mixture reacted with the epihalohydrin.

Specific hydrohalide salts of the diallylamines which can be polymerized to provide the polymer units of the invention include diallylamine hydrochloride
N-methyldiallylamine hydrobromide
2,2'-dimethyl-N-methyldiallylamine hydrochloride
N-ethyldiallylamine hydrobromide
N-isopropyldiallylamine hydrochloride
N-n-butyldiallylamine hydrobromide
N-tert-butyldiallylamine hydrochloride
N-n-hexyldiallylamine hydrochloride
N-octadecyldiallylamine hydrochloride
N-acetamidodiallylamine hydrochloride
N-cyanomethyldiallylamine hydrochloride
N-$\beta$-propionamidodiallylamine hydrobromide
N-acetic ethyl ester substituted diallylamine hydrochloride
N-ethylmethylether substituted diallylamine hydrobromide
N-$\beta$-ethylaminediallylamine hydrochloride
N-hydroxyethyldiallylamine hydrobromide and
N-aceto-hydroazide substituted diallylamine hydrochloride.

Diallylamines and N-alkyldiallylamines, used to prepare the polymers employed in this invention, can be prepared by the reaction of ammonia or a primary amine with an allyl halide employing as a catalyst for the reaction a catalyst that promotes the ionization of the halide such, for example, as sodium iodide, zinc iodide, ammonium iodide, cupric bromide, ferric chloride, ferric bromide, zinc chloride, mercuric iodide, mercuric nitrate, mercuric bromide, mercuric chloride, and mixtures of two or more. Thus, for example, N-methyldiallylamine, in good yield, can be prepared by reaction of two moles of an allyl halide, such as allyl chloride, with one mole of methylamine in the presence of an ionization catalyst such as one of those enumerated above.

In preparing the homopolymers and copolymers for use in this invention, reaction can be initiated by a number of redox catalytic systems. In a redox system, the catalyst is activated by means of a reducing agent which produces free radicals without the use of heat. Reducing agents commonly used are sodium metabisulfite and potassium metabisulfite. Other reducing agents include water-soluble thiosulfates and bisulfites, hydrosulfites and reducing salts such as the sulfate of a metal which is capable of existing in more than one valence state such as cobalt, iron, manganese and copper. A specific example of such a sulfate is ferrous sulfate. The use of a redox initiator system has several advantages, the most important of which is efficient polymerization at lower temperatures. Conventional peroxide catalysts such as tertiary-butyl hydroperoxide, potassium persulfate, hydrogen peroxide, and ammonium persulfate used in conjunction with the above reducing agents or metal activators, can be employed.

As stated above, the linear polymers of diallylamines which are reacted with an epihalohydrin in accordance with this invention can contain different units derived from diallylamines and/or contain units of one or more other copolymerizable monomers. Typically, the comonomer is a different diallylamine, a monoethylenically unsaturated compound containing a single vinylidene group or sulfur dioxide, and is present in an amount ranging from 0 to 95 mole percent of the polymer. Thus, the polymers of diallylamine are linear polymers wherein from 5 to 100% of the recurring units are monomer units derived from (1) a vinylidene monomer and/or (2) sulfur dioxide. Preferred comonomers include acrylic acid, methacrylic acid, methyl and other alkyl acrylates and methacrylates, acrylamide, methacrylamide, acrylonitrile, methacrylonitrile, vinyl acetate, vinyl ethers such as the alkyl vinyl ethers, vinyl ketones, such as methyl vinyl ketone and ethyl vinyl ketone, vinyl sulfonamide, sulfur dioxide or a diallylamine derivative.

Specific copolymers which can be reacted with an epihalohydrin include copolymers of N-methyldiallylamine and sulfur dioxide; copolymers of N-methyldiallylamine and diallylamine; copolymers of diallylamine and acrylamide; copolymers of diallylamine and acrylic acid; copolymers of N-methyldiallylamine and methyl acrylate; copolymers of diallylamine and acrylonitrile; copolymers of N-methyldiallylamine and vinyl acetate; copolymers of diallylamine and methyl vinyl ether; copolymers of N-methyldiallylamine and vinylsulfonamide; copolymers of N-methyldiallylamine and methyl vinyl ketone; terpolymers of diallylamine, sulfur dioxide and acrylamide; and terpolymers of N-methyldiallylamine, acrylic acid and acrylamide.

The epihalohydrin which is reacted with the polymer of a diallylamine can be any epihalohydrin, i.e., epichlorohydrin, epibromohydrin, epifluorohydrin, or epiiodohydrin and is preferably epichlorohydrin. In general, the epihalohydrin is used in an amount ranging from about 0.5 mole to about 1.5 moles and preferably about 1 mole to about 1.5 moles per mole of secondary plus tertiary amine present in the polymer.

The resinous reaction products of the invention can be prepared by reacting a homopolymer or copolymer of a diallylamine as set forth above with an epihalohydrin at a temperature of from about 30° C. to about 80° C. and preferably from about 40° C. to about 60° C. until the viscosity measured on a solution containing 20% to 30% solids at 25° C. has reached a range of A to E and preferably about C to D on the Gardner-Holt scale. The reaction is preferably carried out in aqueous solution to moderate the reaction, and at a pH of from about 7 to about 9.5.

When the desired viscosity is reached, sufficient water is added to adjust the solids content of the resin solution to about 15% or less and the product cooled to room temperature (about 25° C.). The resin solution can be used as such or, if desired, can be adjusted to a pH of at least about 6 and preferably to a pH of below about 5. Any suitable acid such as hydrochloric, sulfuric, nitric, formic, phosphoric and acetic acid can be used to adjust the pH.

The aqueous resin solutions can be applied to paper or other felted cellulosic products by tub application or by spraying, if desired. Thus, for example, preformed and partially or completely dried paper can be impregnated by immersion in, or spraying with, an aqueous solution of the resin, following which the paper can be heated for about 0.5 minute to 30 minutes at temperatures of 90° C. to 100° C. or higher to dry same and cure the resin to a water-insoluble condition. The resulting paper has greatly increased wet and dry strength, and therefore this method is well suited for the impregnation of paper such as wrapping paper, bag paper and the like, to impart both wet and dry strength characteristics thereto.

The preferred method of incorporating these resins in paper, however, is by internal addition prior to sheet formation, whereby advantage is taken of the substantivity of the resins for hydrated cellulosic fibers. In practicing this method, an aqueous solution of the resin in its uncured and hydrophilic state is added to an aqueous suspension of paper stock in the beater, stock chest, Jordan engine, fan pump, head box or at any other suitable point ahead of sheet formation. The sheet is then formed and dried in the usual manner.

The "off-the-machine" wet strength obtained with the resins of the invention will be satisfactory for most applications. Additional wet strength can be obtained by subjecting the paper to a heat treatment. Satisfactory temperatures will be of the order of from about 105° C. to about 150° C. for a period of time from about 12 to 60 minutes, time varying inversely with temperature.

While the reaction products herein described impart substantial wet strength to paper they also improve the dry strength of paper by as much as 40% or more when present in relatively small amounts, i.e., about 0.01% or more, based on the dry weight of the paper. Generally, it will be desirable to use from about 0.1–3% by weight, based on the dry weight of the paper. However, amounts up to 5% or more by weight, based on the dry weight of the paper, can be used if desired.

The following examples illustrate the invention. All percentages are by weight unless otherwise indicated.

EXAMPLE 1

This Example describes the preparation of water-soluble resin compositions by the process of the invention and compares it with a preparation by the process of the prior art.

A. PRODUCTION OF THE POLYAMINE SALT

A solution of 222.4 grams (2.0 moles) of N-methyl diallylamine in 214.4 grams of deionized water and 219.4 grams of 36% concentrated hydrochloric acid was prepared. The pH of the resulting solution was 3.5 and the total concentration of the amine hydrochloride salt in the solution was 45% by weight. The acid was added dropwise with stirring and the reaction vessel was cooled to maintain a reaction temperature of about 10°–15° C.

The reaction vessel was then fitted with a nitrogen inlet tube and purged overnight with nitrogen to blanket the contents from the atmosphere. Then 11.1 grams of a 45% aqueous solution of ammonium persulfate were added with stirring. The temperature of the reaction vessel was gradually raised to 50° C. over a period of 30 minutes and stirring under nitrogen was continued. At about 45° C. the reaction became exothermic and the temperature had to be maintained at about 50° C. by air-jet cooling. After about 45 minutes a noticeable increase in viscosity was observed. After 2.5 hours the reaction had subsided and gentle heat was applied to maintain the 50° C. reaction temperature. The reaction was continued under an $N_2$ blanket for a total of four days and at the end of this time a solution was obtained that contained a total of 44.1% solids, was orange-pink in color and was slightly to moderately viscous. Analysis showed about 84% conversion of monomer to polymer.

The reaction conditions (temperature, reaction time) were chosen to carry the polymerization as far as possible such that the effect of the remaining monomer on the subsequent epichlorohydrin reaction is reduced to a minimum. In fact, the reaction time was limited to four days only because the half life of the catalyst used at 50° C. is about 180 hours. Thus, using the polymerization processes described in the prior art, a conversion of around 84% is about as far as it is possible to go.

B. DEMONOMERIZATION OF POLYMER PRODUCT OF A

400 Grams of the poly(N-methyldiallylamine hydrochloride) solution (1.195 monomer unit equivalent as the hydrochloride salt or 176.4 grams of combined polymer and monomer) were placed in a four-necked round bottomed flask equipped with stirrer, thermometer, a downward condenser and an addition funnel fitted with a pressure equilizing tube. The condenser was attached to an ice-cooled round bottomed flask.

The solution in the flask was first triturated with 50 grams (0.125 equivalent) of a 10% sodium hydroxide solution added incrementally at room temperature. When the addition was complete the pH of the solution was about 8, the solution was very turbid and droplets of oil began to rise to the surface.

The reaction mixture was warmed to 85° C. and a slow nitrogen flow through the addition funnel was begun. An azeotropic distillate began to condense in the condenser and collect in the cooled round bottomed flask. The distillate distilled initially at 62°–64° C. and finally at 71° C.

As the distillation continued and amine monomer was removed, the pH of the reaction mixture began to drop and a second 50 grams of the 10% sodium hydroxide was added dropwise to the reaction mixture. This raised the pH to about 8 again. Azeotropic distillation was recommenced.

Once again the pH began to drop and once again 50 grams of the 10% sodium hydroxide were added to raise the pH to about 8. Distillation was recommenced at 72°–71° C. Upon completion of the distillation the reaction mixture was essentially amine monomer free as evidenced by the lack of the characteristic amine monomer odor and had a stable pH of about 7.7. The resin solution was clear, bright yellow, had a weight of 440 grams and a Gardner viscosity of C.

The azeotropic distillate was separated and purified to isolate the diallylamine monomer. About 16% of the original monomer was found to have been recovered which is in close agreement with the conversion of monomer to polymer found on analysis of the original polymer solution.

C. REACTION OF THE PRODUCT OF A (ABOUT) WITH EPICHLOROHYDRIN

A flask equipped with a stirrer, a thermometer, and an addition funnel was charged with 33.37 grams (0.1 monomer unit) of the product of A (above). The solution had about 45% total solids, a pH of 1.5 and a Gardner viscosity of E-E+. A further charge of 67.96 grams of water was placed in the flask along with 4.5 grams of 10% sodium hydroxide (0.01125 equivalent) thus raising the pH of the mixture of 8.4.

Addition of 7.40 grams (0.080 mole) of epichlorohydrin was begun dropwise through the addition funnel and completed within 1.0 minute. The temperature was then slowly raised, over a period of fifty minutes, from 10° C. to 50° C. after which this temperature was maintained for a further 1 hour and 50 minutes. During this time the oily turbid liquid in the reaction vessel began to clear, and the Gardner viscosity rose. At three points during the reaction further charges of 2 grams of the 10% sodium hydroxide solution was added to raise the pH.

At the end of the reaction time, 0.50 gram of 96% sulfuric acid was added to kill further reaction by lowering the pH to 1.0.

The acid-stabilized resin solution obtained had a clear, very pale orange-yellow appearance and represented 91.4% of the theoretical yield. The Gardner viscosity was E—E+ at a total solids level of 15.45%.

D. REACTION OF THE PRODUCT OF B (ABOVE) WITH EPICHLOROHYDRIN

The procedure described in C was repeated using 44.0 grams (0.100 amine monomer unit) of the product of B above, i.e., the demonomerized polyamine and 65.2 grams of water along with a single 2.0 gram addition of 10% sodium hydroxide solution to maintain the pH around 8. The epichlorohydrin (7.40 grams or 0.08 mole) was again added dropwise during the first minute of reaction, which had a total elapsed time of 2 hours, 25 minutes. The reaction was short-stopped using 0.50 gram of 96% sulfuric acid.

The acid stabilized resin solution was clear, orange colored and had a Gardner viscosity of F at 15.72% total solids. The yield of product represented 90.9% of the theoretical.

EXAMPLE 2

This Example shows the wet tensile strengths in both the cured and uncured states of the product obtained in procedures described in Sections C and D of Example 1.

The demonomerized, acid-stabilized resin produced in Section D of Example 1 and the monomer-containing resin produced in Section C of Example 1 were applied to paper substrates which were then separated into two groups. One group was tested for wet tensile strength in the uncured state, the other was first cured and then tested for wet tensile strength. The procedures used for application and testing were as set forth above. The curing was done at 90° C. for a period of 15 minutes. The results obtained are set forth in Table 1.

TABLE 1

WET TENSILE STRENGTHS IN gm/cm (Average of 4 results)

| | Application Level (Kilos/metric ton) | | |
|---|---|---|---|
| | 2.5 | 5.0 | 7.5 |
| Demonomerized - uncured | 470 | 611 | 752 |
| Non-demonomerized - uncured | 384 | 511 | 609 |
| Demonomerized - cured | 557 | 691 | 786 |
| Non-demonomerized - cured | 447 | 561 | 682 |

From the above results it can clearly be seen that a all application levels, the removal of the monomer has a dramatic and beneficial effect on the wet tensile strength of the treated paper.

EXAMPLE 3

This Example illustrates the effect of demonomerization on the wet strength of the resin produced by the reaction.

The procedures outlined in Sections C and D of Example 1 were utilized to prepare polymers that had been demonomerized and non-demonomerized. The reaction parameters used in epichlorohydrination are set out in Table 2.

TABLE 2

| | Demonomerized Polyamine (D) | Non-demonomerized Polyamine (C) |
|---|---|---|
| Monomer/Polymer conversion | 83.9% | 83.9% |
| Epichlorohydrin/Amine ratio | 1.20 | 1.20 |
| Equivalents of sodium hydroxide | .125 | .30 |
| Reaction Time | 2.40 | 2.55 |
| pH at 25° C. | 1.74 | 1.43 |
| % Solids in Final Resin Solution | 15.21 | 15.11 |
| Gardner Viscosity | C | G+/H− |

The above resins were applied to paper substrates and tested for cured and uncured wet tensile strengths by the procedures outlined above. The results are set forth in Table 3.

TABLE 3

WET TENSILE STRENGTHS (in gm/cm)

| | Application Level in kilos/metric ton | Resin from Demonomerized Polyamine | Resin from non Demonomerized Polyamine |
|---|---|---|---|
| Uncured | 2.5 | 509 | 423 |
| | 5.0 | 600 | 570 |
| | 7.5 | 680 | 616 |
| Cured | 2.5 | 591 | 511 |
| | 5.0 | 689 | 666 |
| | 7.5 | 761 | 704 |

From the above Table it can be seen that the cured and uncured wet strengths of the resin prepared from the demonomerized polyamine are much superior to those obtained in the absence of the demonomerization step, especially at low application levels.

It is understood that the foregoing description is given merely by way of illustration and that many variations and modifications may be made therein without departing from the spirit and scope of this invention.

What is claimed is:

1. A process for the production of an acid stabilized resin solution which process comprises
    (1) polymerizing an aqueous solution of a diallylamine hydrohalide salt having the formula $(CH_2=C(R)-CH_2 NHR'+X^-$ wherein the R groups are the same or different and are selected from hydrogen and lower alkyl groups, R' is selected from hydrogen, alkyl and substituted alkyl groups and $X^-$ is a halide ion, either alone or as a mixture with other copolymerizable monomers in the presence of a free radical catalyst to form a polymer in which from 5 to 100% of the recurring units are derived from the diallylamine;
    (2) raising the pH of the solution sufficiently to convert at least part of the residual unpolymerized monomeric amine salt to free amine but not so high as to precipitate the polyamine from solution;

(3) separating the free amine monomer from the polyamine solution;

(4) reacting the polyamine with from about 0.5 to about 1.5 moles of an epihalohydrin per mole of amine present in said polymer at a temperature of about 30° to about 80° C. and a pH from about 7 to about 9.5 to form a water-soluble resinous reaction product containing epoxide groups; and (5) reacting the resinous reaction product in aqueous solution, with from about 0.3 equivalents to about 1.2 equivalents per equivalent of epihalohydrin of a water-soluble acid selected from the group consisting of hydrogen halide acids, sulfuric acid, nitric acid, phosphoric acid, formic acid and acetic acid until the epoxide groups are converted substantially to the corresponding halohydrin groups and an acid-stabilized resin solution is obtained.

2. The process of claim 1 in which the amine monomer is removed from the polyamine solution by the use of distillation.

3. The process of claim 1 in which the separated amine is converted into the hydrohalide salt and recycled to the amine polymerization stage.

* * * * *